(12) United States Patent
English et al.

(10) Patent No.: US 8,630,819 B2
(45) Date of Patent: Jan. 14, 2014

(54) SYSTEM AND METHOD FOR ELECTRONIC INSPECTION AND RECORD CREATION OF ASSEMBLY, REPAIR AND MAINTENANCE OPERATIONS

(75) Inventors: Kent L. English, St. Charles, MO (US); Bryan G. Dods, Ballwin, MO (US); Christopher K. Zuver, Saint Peters, MO (US); Thomas E. Shepherd, St. Louis, MO (US); Douglas D. Trimble, Saint Peters, MO (US); Carl J. Hanks, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 467 days.

(21) Appl. No.: 12/032,899

(22) Filed: Feb. 18, 2008

(65) Prior Publication Data

US 2009/0210083 A1    Aug. 20, 2009

(51) Int. Cl.
*G01N 37/00* (2006.01)
*G21C 17/00* (2006.01)
*G06F 11/30* (2006.01)

(52) U.S. Cl.
USPC ............................... 702/186; 702/81; 702/84

(58) Field of Classification Search
USPC .................. 702/81, 84, 186; 705/11
See application file for complete search history.

(56) References Cited

U.S. PATENT DOCUMENTS

| | | | |
|---|---|---|---|
| 4,441,809 A | 4/1984 | Dudley et al. | |
| 4,796,198 A | 1/1989 | Boultinghouse et al. | |
| 4,820,041 A | 4/1989 | Davidson et al. | |
| 5,100,229 A | 3/1992 | Lundberg et al. | |
| 5,110,202 A | 5/1992 | Dornbusch et al. | |
| 5,294,970 A | 3/1994 | Dornbusch et al. | |
| 5,309,212 A | 5/1994 | Clark | |
| 5,579,102 A | 11/1996 | Pratt et al. | |
| 5,991,145 A * | 11/1999 | Lagrotta et al. | ............... 361/212 |
| 6,374,195 B1 * | 4/2002 | Li et al. | ............... 702/182 |
| 6,381,006 B1 | 4/2002 | Ramstrom | |
| 6,400,452 B1 | 6/2002 | Maynard | |
| 6,437,860 B1 | 8/2002 | Jappinen | |

(Continued)

FOREIGN PATENT DOCUMENTS

WO    WO 2005028165 A1 *  3/2005  ............... B25H 3/02

OTHER PUBLICATIONS

PCT International Search Report and Written Opinion for corresponding International Application No. PCT/U809/33949 mailed Sep. 1, 2010, 8 pages.

*Primary Examiner* — Janet Suglo
(74) *Attorney, Agent, or Firm* — Harness, Dickey & Pierce, P.L.C.

(57) ABSTRACT

A method for generating an electronic quality record of a manufacturing operation that may involve generating inputs from a plurality of information sources located within a manufacturing environment. The plurality of information sources may provide information pertaining to at least a tool being used, an individual using the tool, and an operation that the tool is being used by the individual to perform. A locating system may be used that is in communication with the plurality of information sources to monitor a location and an operation of the tool. A processor may be in communication with the locating system to receive the generated inputs and to generate an electronic record upon completion of the operation that the tool is being used by the individual to perform. The electronic record may identify that the operation has been performed by the individual using the tool in accordance with a predefined standard.

21 Claims, 8 Drawing Sheets

(56) References Cited

U.S. PATENT DOCUMENTS

| | | |
|---|---|---|
| 6,452,668 B1 | 9/2002 | Pratt |
| 6,501,543 B2 | 12/2002 | Hedges et al. |
| 6,510,987 B1 * | 1/2003 | Hengriprasopchoke et al. .................. 235/380 |
| 6,519,029 B1 | 2/2003 | Hedges et al. |
| 6,535,282 B2 | 3/2003 | Hedges et al. |
| 6,545,751 B2 | 4/2003 | Beliveau et al. |
| 6,618,133 B2 | 9/2003 | Hedges et al. |
| 6,621,565 B2 | 9/2003 | Pratt et al. |
| 6,630,993 B1 | 10/2003 | Hedges et al. |
| 6,662,103 B1 | 12/2003 | Skolnick et al. |
| 6,738,748 B2 | 5/2004 | Wetzer |
| 6,809,522 B2 * | 10/2004 | Nguyen ........................ 324/457 |
| 6,845,279 B1 * | 1/2005 | Gilmore et al. ............... 700/115 |
| 6,989,749 B2 * | 1/2006 | Mohr ........................ 340/572.1 |
| 7,171,372 B2 | 1/2007 | Daniel et al. |
| 7,209,041 B2 * | 4/2007 | Hines et al. ................. 340/572.4 |
| 7,298,152 B1 | 11/2007 | Wilke et al. |
| 2003/0069648 A1 | 4/2003 | Douglas et al. |
| 2007/0106525 A1 | 5/2007 | McKinney |
| 2007/0109103 A1 * | 5/2007 | Jedrey et al. ................. 340/10.5 |
| 2007/0250411 A1 * | 10/2007 | Williams ........................ 705/28 |
| 2008/0030322 A1 | 2/2008 | Stauffer et al. |
| 2008/0088454 A1 | 4/2008 | Flores et al. |
| 2008/0103843 A1 | 5/2008 | Goeppert et al. |
| 2008/0103914 A1 * | 5/2008 | Hussain ........................ 705/26 |
| 2008/0154712 A1 | 6/2008 | Wellman |
| 2008/0157928 A1 * | 7/2008 | Butler et al. ................. 340/10.1 |

* cited by examiner

SYSTEM AND METHOD FOR ELECTRONIC INSPECTION AND RECORD CREATION OF ASSEMBLY, REPAIR AND MAINTENANCE OPERATIONS

CROSS-REFERENCE TO RELATED APPLICATIONS

This application is related in general subject matter to co-pending U.S. patent application Ser. No. 11/408,754, filed Apr. 21, 2006, and assigned to The Boeing Company, which is hereby incorporated by reference into the present disclosure.

FIELD

The present disclosure relates to electronic systems for monitoring and evaluating assembly, repair and maintenance actions, and more particularly to a system and method for monitoring the performance of an assembly, repair or maintenance operation by individuals and automatically creating an electronic record to verify that the operation has been properly performed by the individual using one or more of proper procedures, tools, certified parts or consumables, etc.

BACKGROUND

The statements in this section merely provide background information related to the present disclosure and may not constitute prior art.

Various types of electronic inspection systems have been implemented in various types of work environments. Such systems often use video cameras and some type of pattern recognition in an attempt to monitor and record various operations performed with specific tools or by specific individuals. Such electronic inspection systems are often desired (and sometimes required) in certain manufacturing operations, for example with the manufacture of commercial and military aircraft. When manufacturing commercial and military aircraft, it is especially important for assembly, test, repair or maintenance technicians to follow detailed procedures, as well as to use certified tools or other equipment. Often certified parts or consumable items must be used as well when performing assembly, test, repair or maintenance operations. Thus, there is a need to ensure that various assembly, test, repair and maintenance procedures are performed in accordance with predefined standards or requirements. The use of video cameras and associated pattern recognition systems have sometimes been employed in an attempt to verify that such predefined procedures are being followed by the assembly, test, repair or maintenance technicians.

One specific drawback with video based systems is that such systems often employ video sensors that are subject to lighting and other environmental factors in the manufacturing environment. Variations in the lighting in a manufacturing environment can produce diverse outputs from video sensors. Moreover, present day video based systems typically are not able to consider and tie together relevant input information such as who is operating a specific tool, the operator's training or certification, whether the tool or equipment being used has been certified or properly calibrated, and whether a proper process has been followed (e.g., ensuring that a specific type of fastener has been tightened in a specific tightening sequence).

SUMMARY

The present disclosure relates to a system and method adapted to generate a real time electronic record of a manufacturing, test, repair or maintenance operation from various inputs received within a manufacturing environment. The system and method is able to effectively capture important information as it is produced, in real time, during a manufacture, test, repair or maintenance operation being performed by an individual.

In one implementation a method is disclosed for generating an electronic quality record of a manufacturing operation. The method involves generating inputs from a plurality of information sources located within a manufacturing environment. The information sources provide information pertaining to at least a tool being used, an individual using the tool, and an operation that the tool is being used by the individual to perform.

A locating system is used in communication with the information sources to monitor a location and an operation of the tool. A processor communicates with the locating system to receive the generated inputs, and to generate an electronic record upon completion of the operation that the tool is being used to perform. The electronic record may identify that the operation has been performed by the individual using the tool in accordance with a predefined standard.

In various implementations and embodiments various information sensors and databases may be used to supply information to the processor that is used to create the electronic record. Such information sources may comprise a database of information pertaining to which employees are authorized to perform specific manufacturing operations, a database to indicate what certifications are required for individuals performing certain manufacturing operations or for using certain tools or equipment, and a database of calibration information that may be used to calibrate a tool or piece of equipment being used to perform the manufacturing operation.

In other implementations and embodiments a drawing or process database of information may be provided for use by the processor. This database may also be used by the locating system in tracking movement and use of the tool or equipment being used by the individual.

In still other embodiments the locating system may involve the use of an indoor global positioning system (GPS) that is able to wirelessly monitor the movements of the tool and/or even the individual using the tool to a high degree of positional accuracy. Still other embodiments may involve the use of a radio frequency identification reader (RFID reader) and an associated RF ID tag on the work piece or part being worked on with the tool. The RFID reader may be used to supply information to the processor about the specific type of part being worked on by the tool.

The various embodiments and methods described herein all enable a real time quality record of a manufacturing, test, repair or maintenance operation to be created using a plurality of sources of information available within (or even outside of) the manufacturing environment in which the operation is taking place. The electronic quality records can be stored and used to verify that proper procedures have used by authorized individuals, using properly calibrated tools, to perform a given manufacturing operation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
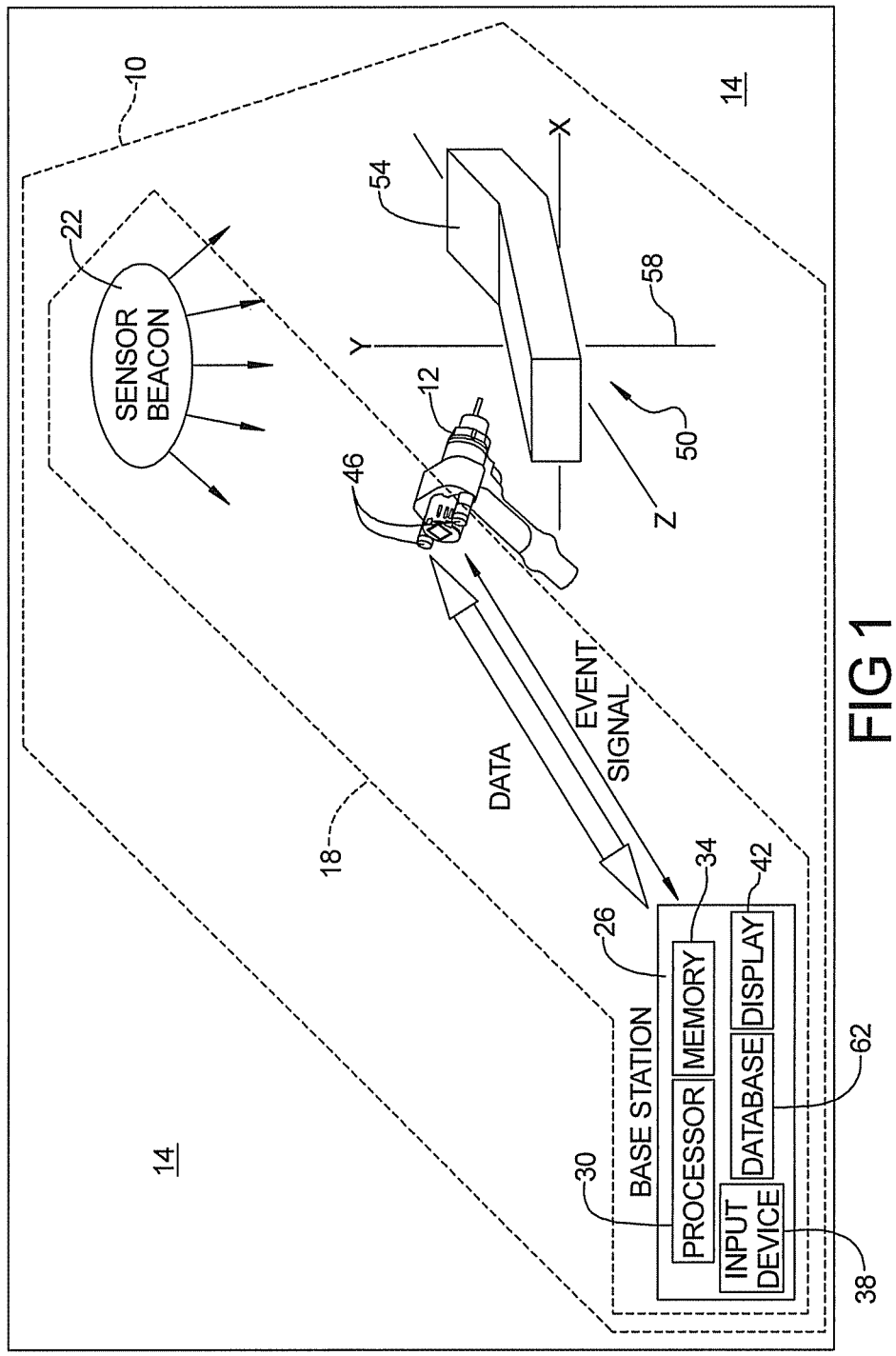
FIG. 1 is a block diagram of an assembly tracking verification system (ATVS), in accordance with various embodiments.

The following description is merely exemplary in nature and is not intended to limit the present disclosure, application, or uses.

The present disclosure will become more fully understood from the detailed description and accompanying drawings, wherein corresponding reference numerals indicate corresponding parts throughout the several views of drawings.

Referring first to FIGS. 1-6, a discussion will be provided of various embodiments of an assembly task verification system (ATVS) 10 that is able to verify performance of a particular assembly task or operation by a tool 12, within a localized environment 14. The various embodiments discussed in connection with FIGS. 1-6 may be helpful to the reader in gaining an understanding of the underlying technology involving a sophisticated task verification system, and may be of help in understanding the systems and methods being claimed in the present disclosure. Furthermore, although the following discussion may reference the term "assembly task" verification system, it should be understood that the scope of the disclosure should not be limited to an 'assembly' task. More particularly, the phrase 'assembly task', as used herein, should be understood to mean any task or operation performed by the tool 12, within the localized environment 14, for which verification of the task is desired. For example, the phrase 'assembly task' can include such tasks as fabrication tasks, inspection tasks, assembly tasks, etc. The discussion of FIGS. 7 and 8 make this clear by introducing systems and methodologies that build upon the subject matter of FIGS. 1-6 to enable the creation of electronic records that associate, for example, individuals, calibration standards and/or predefined process operations, with the performance of a manufacturing operation, to create an electronic quality record. The electronic quality record may be used to verify that a manufacturing operation was performed by a qualified (or certified) individual, using a properly calibrated tool, and using certified parts or consumable items while performing the manufacturing operation in accordance with the predefined process.

Referring initially to FIG. 1, the tool 12 can be any tool or instrument utilized by an operator to perform a task, e.g., assembly task, whereby completion of the task is to be verified by the ATVS 10. For example, the tool 12 may be a drill, a torque tool, a pneumatic impact tool, a rivet gun or any other tool or instrument utilized to perform a specified task or operation. The localized environment 14 may be any defined space suitable for employing an indoor object location system 18. For example, the localized environment 14 may be an indoor manufacturing facility, an outdoor construction site or a pavilion-like covered work space. The indoor object location system 18 may comprise an indoor global position system (GPS). Furthermore, although the ATVS 10 will be described herein as employing an indoor GPS 18, it should be understood that any suitable indoor object location system 18 could be implemented and remain with the scope of the present disclosure.

In various embodiments the indoor GPS 18 may include at least one sensor beacon 22 and at least one base station 26. However, it should be understood that one or more sensor beacons 22 and one or more base stations 26 could also be used, depending on the specific manufacturing application.

The base station 26 may form a computer-based device including a processor 30, e.g., a microprocessor, and at least one electronic storage device 34. The processor 30 may be any processor suitable to execute all functions of the base station 26. The electronic storage device(s) 34 may be any computer readable medium suitable for electronically storing data, information, algorithms and/or software programs executable by the processor 30. For example, in various embodiments the electronic storage device(s) 34 may be memory device(s) such a hard drive, EEPROM, Flash Memory, OTP memory or any other electronic data storage device or medium. In various other embodiments the electronic storage device(s) 34 may be remotely located from the base station 26. Furthermore, the electronic storage device(s) 34 can be removably connectable to the base station 26. For example, the electronic storage device(s) 34 may form a universal serial bus (USB) hard drive, a Zip drive disk, a CDRW drive disk, a DVDR drive disk, a thumb drive or any other removable electronic storage device.

The base station 26 may also include an input device 38 such as a keypad, a mouse, a stylus or a joy stick for inputting data and information to the base station 26 to be stored on the electronic memory device 34. The base station 26 may also include a display 42 for illustrating graphical and/or textual/numeric data and various other forms of information. Still further, the base station 26 can be wired or wirelessly connected or connectable to a remote computer based system (not shown). For example, the base station 26, may be wired or wirelessly connected or connectable to a remotely located server system such that data, information, algorithms, operational commands for the assembly task verification system 10, software programs, or any other data can be communicated to and/or from the base station 26.

Figure 2:
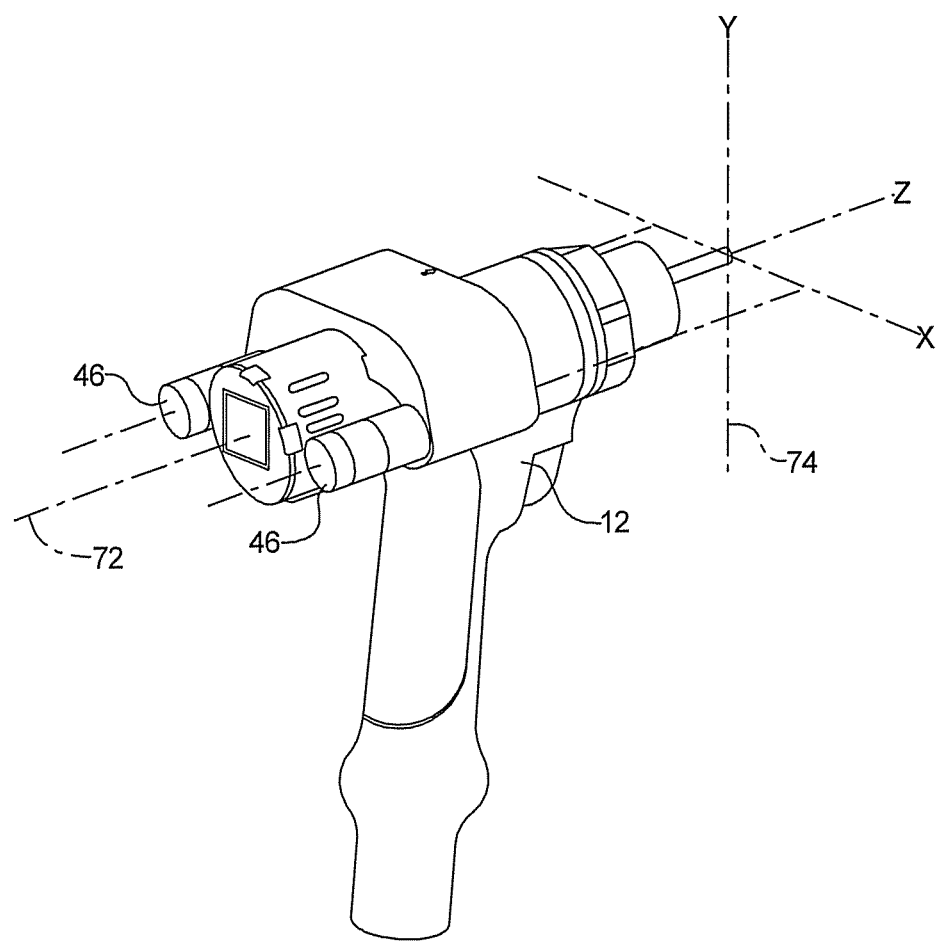
FIG. 2 is an exemplary illustration of a tool having at least one location sensor included in the ATVS system of FIG. 1 attached, in accordance with various embodiments.

The ATVS 10 additionally may include at least one location sensor 46, best shown in FIG. 2, affixed to the tool 12 for wireless communication with the sensor beacon 22. Furthermore, the ATVS 10 includes a work cell 50 in which the operator performs an assembly task that is verified by the ATVS 10. The task to be verified may be any assembly task required to assemble any structure, part, component or assembly in accordance computerized assembly and design drawings or schematic, e.g., computer aided drafting (CAD) or Unigraphics drawings. For example, the task to be verified can be drilling a hole, tightening a bolt, tightening a screw or securing a rivet of an aircraft substructure, such as a wing assembly. For convenience, the hole to be drilled, the bolt to be tightened, the screw to be tightened, the rivet to be secured, etc., are referred to herein below as 'features' operated on by the tool 12. Generally, any unique feature on the structure 54 that can be described mathematically in the computerized assembly and design drawings or schematic can be a feature. Also, for convenience, the structure, part, component, assembly, etc., to be assembled will be referred to herein below simply as the "structure" to be assembled and is shown and identified in FIG. 1 as the structure 54. Additionally, although the task to be performed is generally referred to herein in the singular, i.e., a single task, it should be understood that the ATVS 10 may be used to verify a plurality of tasks. For example, the ATVS 10 can be utilized to verify that every hole required for securing a skin to an aircraft wing assembly is drilled and that every rivet required to secure the skin to the wing assembly is secured within each hole.

The work cell 50 may be any space within the localized environment 14 used to assemble the structure 54, such as a space including an assembly jig for fixedly holding the structure 54 during assembly. The work cell 50 may be a predefined and dedicated area or space within the localized environment 14 specifically designated for assembly of the structure 54. For example, the work cell 50 may be a space having an assembly jig fixed to a floor of the localized environment 14 specifically designated for repetitious use in assembling various structures 54. In various other embodiments the work cell 50 may be any area or space, moveable or temporarily fixed, within the localized environment 14 where assembly of the structure 54 is performed. For example, the work cell 50 may be an assembly jig mounted on wheels that can be moved to any location within the localized environment 14. Alternatively, the work cell 50 may be a portion of an automated assembly line process within localized environment 14 where the work cell 50 and structure 54 move during assembly of the structure 54.

As described below, the ATVS 10 may overlay a work cell coordinate system 58, e.g., a Cartesian coordinate system, on the structure 54. More particularly, the work cell coordinate system 58 may be overlaid onto the structure in a fixed fashion such that throughout assembly of the structure 54 the relationship between the work cell's coordinate system 58 and the structure 54 is fixed and unchanged. Thus, if the structure 54 is moved, the work cell 50 moves with the structure 54, and relationship between the work cell coordinate system 58 and the structure 54 remains fixed and unchanged.

In various embodiments the base station electronic storage device 34 may include an ATVS algorithm executable by the processor 30 for verifying the completion of one or more assembly tasks. Additionally, the base station 26 may include a data base 62 for storing data such as computerized assembly and design drawings or schematics of a plurality of different structures 54 to be assembled.

Figure 3:
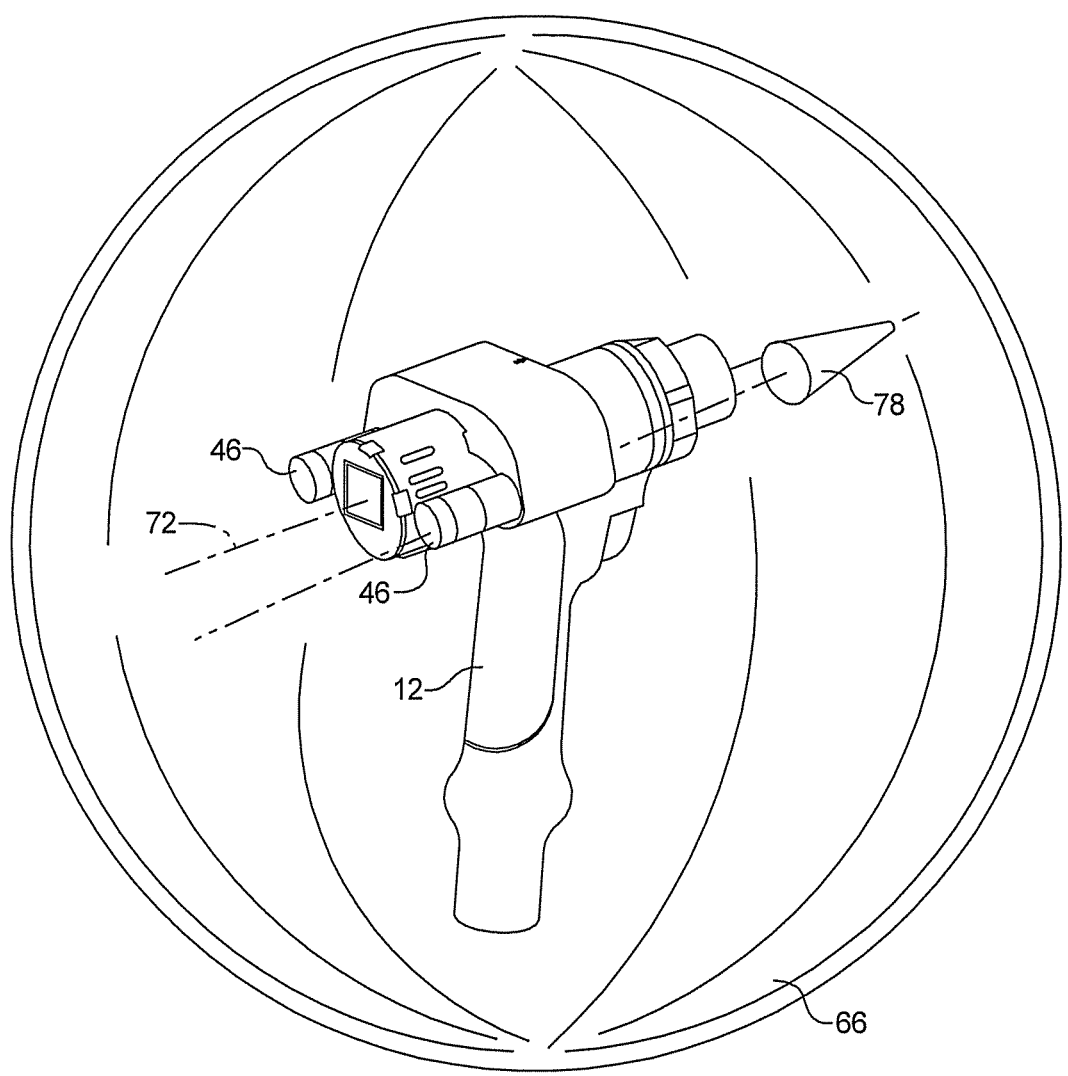
FIG. 3 is an exemplary illustration of a spherical object locus generated by the ATVS shown in FIG. 1, in accordance with various embodiments.
Figure 4:
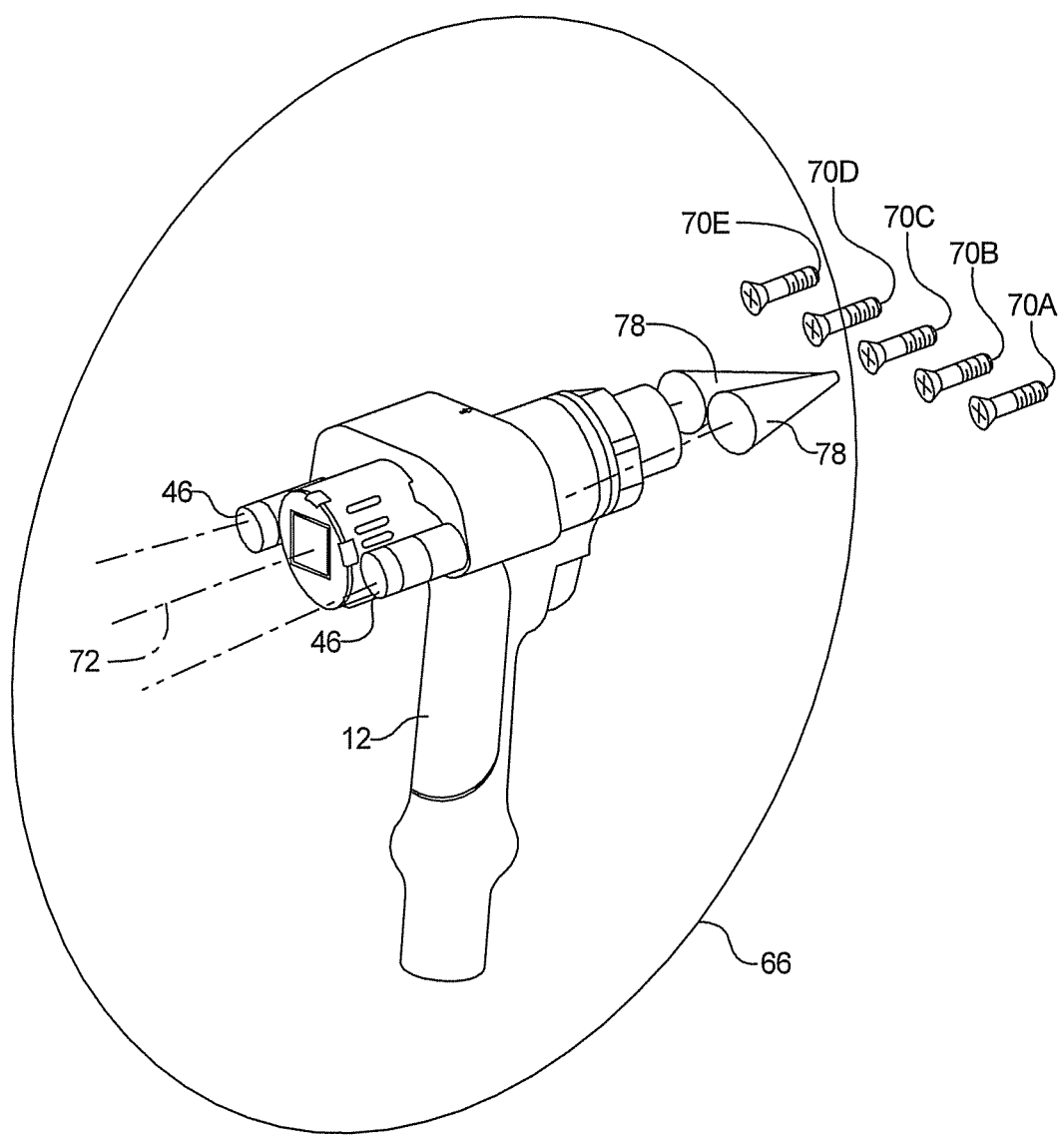
FIG. 4 is an exemplary illustration of a circular object locus generated by the ATVS shown in FIG. 1, in accordance with various embodiments.

Referring now to FIGS. 2, 3 and 4, generally, the ATVS 10 utilizes the indoor GPS system 18 to determine a location of the tool 12 upon receipt of an event signal from the tool 12. The event signal indicates to the base station 26 the completion of a task, e.g., the insertion and fastening of a rivet. Upon receipt of the event signal, the indoor GPS 18 reads or senses the location sensors 46 to accurately assess the location of the location sensors 46 within the work cell 50, e.g., accurate to within $\frac{1}{100}^{th}$ of an inch. The sensor beacon 22 emits timed laser pulses received by the location sensors 46. Upon completion of a task, along with the event signal, the location sensors 46 send location data, i.e., sensor readings, to the base station 26. The sensor readings are determined by the location sensors 46 based on the receipt of the timed laser pulses from the sensor beacon 22. The location data, i.e., sensor readings, provides the base station 26 with a three-dimensional location of the location sensors 46 within the work cell 50, with respect to the work cell coordinate system 58.

Based on the sensor readings, the base station 26 determines a locus 66 of possible location points within the work cell 50 for the object end of the tool 12. The "object end" of the tool 12 may be the tip of the tool that contacts the feature to perform the task. The locus 66 of possible location points, within the work cell 50, for the object end of the tool 12 will be referred to herein as the "object locus 66". Then, accessing the computerized assembly and design schematic of the structure 54, and knowing an established location and orientation of the structure 54 within the work cell 50 with respect to the work cell coordinate system 58, the base station 26 generates a probability that various features are located within the object locus 66. The feature with the highest probability, over a predetermined threshold value (e.g., 50%) is determined to be the feature operated on. Thus, the task of operating on that particular feature (e.g., inserting and securing a specific rivet) is verified. For example, as illustrated in FIG. 4, the base station 26 will calculate or generate a probability that each of the features 70A, 70B, 70C, 70D and 70E are within the object locus 66. If feature 70C is determined to have the highest probability in excess of a predetermined value, feature 70C is considered the feature operated on by the tool 12 at the time the event signal was sent. Therefore, the task of operating on feature 70C is verified by the ATVS 10.

The ATVS 10 may calculate/generate the probability of being within the object locus 66 for every feature designated in the computerized assembly and design drawings or schematics for the structure 54, and then determine which feature has the highest probability above the threshold to verify task completion. Alternatively, the ATVS 10 may calculate/generate the probability of being within the object locus 66 for a select group of features for the structure 54, as described below, and then determine which feature of the select group has the highest probability above the threshold to verify task completion.

The various embodiments are described herein in terms of the ATVS 10 or the base station 26 calculating or generating probabilities or having a direct affect on, or direct control of, verifying completion of tasks. However, it should be understood that it is the instructions generated by the execution of the one or more algorithms, via the processor 30 and the subsequent implementation of those instructions by the base station 26 that calculate or generate the probabilities and that have a direct affect on, or direct control of, verifying task completion.

Referring particularly to FIG. 2, prior to execution of the ATVS algorithm, one or more sensors 46 are fixed to arbitrary positions on the tool 12. The sensors 42 are calibrated to have known coordinates relative to the object end of the tool 12 (e.g., the tip of the tool 12) and a line of action vector 72 of the tool 12. More particularly, a tool coordinate system 74 is established such that the origin of the coordinate system 74 is at the object end of the tool 12 and the axis of the line of action vector 72 (for example a vector representing the twist axis of a torque tool) is along an axis of the coordinate system 74. The location of the location sensors 46 relative to the origin (i.e., the object end of the tool 12) are then measured and stored in the electronic storage device 34 as calibration data for the tool 12. Additionally, prior to execution of the ATVS algorithm, the location, placement and orientation of the structure 54 within the work cell 50, with respect to the work cell coordinate system 58, is determined and stored in the electronic storage device 34 as calibration data for the structure 54. In various embodiments, the structure 54 may be "locked" into place within the work cell 50 such as by mounting in a jig affixed to the floor of the localized environment 14. Thus, the location and orientation of the structure 54 within the work cell 50, with respect to the work cell coordinate system 58, can be determined using simple fixed measurements. The structure 54 may also be mounted in a movable jig and the location and orientation of the structure 54 within the work cell 50, with respect to the work cell coordinate system 58, may be determined using a laser measurement system. The data identifying the location and orientation of the structure 54 can then be provided to the electronic storage device 34.

Upon activation of the ATVS 10 and execution of the ATVS algorithm, the structure calibration data is converted to the units and coordinate system employed in the computerized assembly and design drawings or schematic, for example CAD or Unigraphics units and coordinates. The location sensors 46 are then tracked within the work cell 50 by the indoor GPS system 18 as the operator uses the tool 12 to perform the various stipulated tasks. When the tool 12 performs an intended action an event signal is sent to the base station 26. For example, the intended action of a torque tool can be when the torque generated by the torque tool reaches a certain level indicating that a fastener has been tightened to a desired level of torque. Thus, each time the torque tool tightens a fastener to the desired torque level, an event signal is sent to the base station 26. Or, for example, the intended action of a drill can be when the torque generated by the drill drops significantly after reaching a certain torque level, thereby indicating that the drill bit has cut through the part being drilled and a hole has been created. Thus, each time the drill cuts through the part, creating a hole, an event signal is sent to the base station 26.

When the tool 12 performs an intended action and an event signal is sent, the location of all the visible location sensors 46 on the tool 12 may be determined by the respective location sensors 46 and captured by the base station 26. Thus, upon each event signal, the indoor GPS 18 accurately determines the location of the tool 12 within the work cell 50. For example, the indoor GPS 18 can determine the location of the tool 12 within the work cell 50 to within approximately $\frac{1}{100}^{th}$ of an inch (0.254 mm). Execution of the ATVS algorithm then utilizes the structure calibration data to correlate the location of the tool 12 with the computerized assembly and design drawings or schematic. That is, the location of the tool 12 with respect to the structure 54 within the work cell coordinate system 58 is mathematically converted to a representative or 'virtual' location of the tool 12 with respect to the structure 54 within the computerized assembly and design drawings or schematic. The ATVS algorithm also utilizes the tool calibration data to determine the object locus 66 of all possible location points within the work cell 50, of the object end of the tool 12. Additionally, the ATVS algorithm may also utilize the tool calibration data to determine all possible lines of action vectors 72 for the object end of the tool 12. The object locus 66 and line of action vectors 72 are then also correlated with the computerized assembly and design drawings or schematic. That is, the object locus 66 and line of action vectors 72 are mathematically converted to a representative or 'virtual' object locus and 'virtual' line of action vectors within the computerized assembly and design drawings or schematic.

The ATVS algorithm may then compare the values (i.e. coordinates) of all points within the virtual object locus and the virtual line of action vectors with a list of feature data, i.e., coordinates of each feature of the structure 54. The feature data is provided by, or derived from, the computerized assembly and design drawings or schematic. Based on these comparisons, a probability value may be calculated for each feature. The probability values indicate the closeness of the coordinates for each feature to the coordinates and line of action vector of each point within the virtual locus. More particularly, the probability values indicate the probability that each feature is the feature operated on at the time the event signal was generated. The feature having coordinates closest to the coordinates and line of action vector of any of the virtual object locus points will have the highest probability value and thus will be determined to be the feature operated on. That is, the feature that most closely matches a possible tool tip location and orientation is the most likely feature that was operated upon. Accordingly, verification of the task of operating on the feature with highest probability will be accomplished. In most instances, most features will have a probability of approximately zero, because it is just physically impossible that their coordinates match the coordinates and line of action vectors of any of the points within the virtual locus. However, the feature that was actually operated on at the time of the event signal will typically have a probability of approximately 90% or greater.

In various embodiments, as illustrated in FIGS. 1 through 4, the ATVS 10 may include at least two location sensors 46. When the event signal is generated, based on the timed laser pulses from the sensor beacon 22, each location sensor 46 determines its three-dimensional location within the work cell 50, as described above. If the line-of-sight between the sensor beacon 22 and any of the location sensors 46 is blocked, that is the timed laser pulses are obstructed or otherwise prevented from reaching a location sensor 46, at the time of the event signal, then location data can only be captured for the remaining unblocked location sensor(s) 46. Because the ATVS 10 uses probabilities to determine task verification, even with a location sensor 46 blocked, the ATVS 10 can accurately verify completion of the tasks. Therefore, upon each event signal, the ATVS algorithm uses location data readings from all unblocked and/or partially blocked location sensors 46 to generate the object locus 66 and the line of action vectors 72.

For example, referring to FIG. 3, if a single unblocked location sensor 46 provides a location reading to the base station 26, then the points of the object locus 66 describe a sphere. Each point on the sphere corresponds to a cone 78 that describes the possible line of action vectors 72 of the tool 12. As a further example, referring to FIG. 4, if two location sensors 46 are unblocked and provide a location reading to the base station 26, then the points of the object locus 66 describe a circle with each point on the circle corresponding to one of two cones 78 that describe the possible line of action vectors 72 of the tool 12. If a sufficient amount of location data is captured, for example if three location sensors 46 fully located are unblocked or four sensors are partially blocked, then the object locus 66 of tool tip locations is reduced to a single point and a single line of action vector. The location and orientation the tool 12 tip will then be fully known.

Execution of the ATVS algorithm operates to compare each candidate feature, e.g., features 70A, 70B, 70C, 70D and 70E, in turn with each point and line of action vector of the virtual object locus. This gives a distance and angle of each candidate feature to each point in the virtual object locus. The distance and angle are then used to determine the probability that the tool tip location and orientation matches that of each candidate feature. In this way a probability is calculated for each candidate feature, and the candidate features with higher probability values are closer matches. If the probability value is above a certain threshold, e.g., 50%, and sufficiently above the candidate feature with the next highest probability, then there is a high likelihood that the particular candidate feature is the feature operated on at the time of the event signal.

Figure 5:
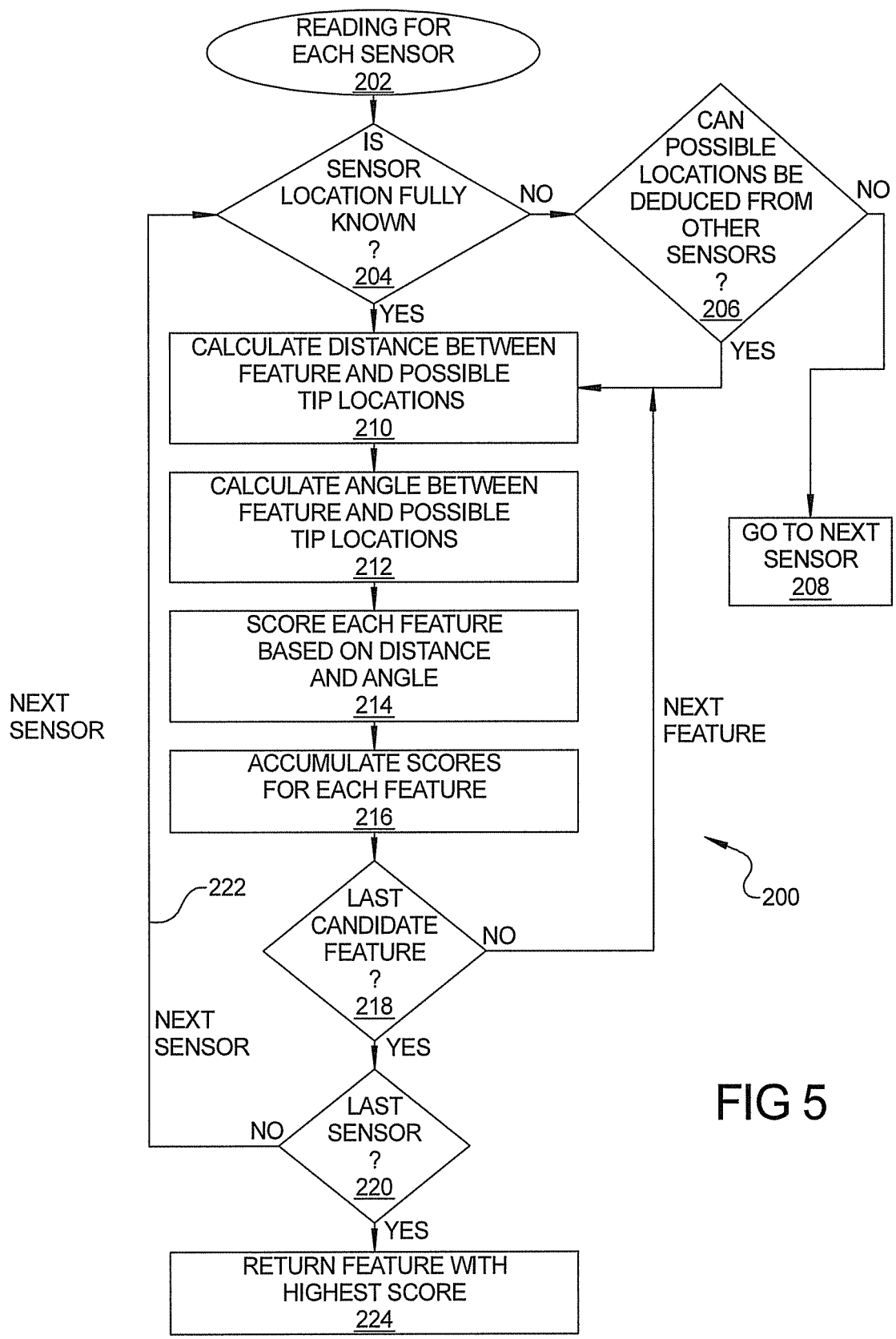
FIG. 5 is a flow chart illustrating an exemplary operation of the ATVS shown in FIG. 1, in accordance with various embodiments.

Referring now to FIG. 5, a flow chart 200 is provided illustrating an exemplary operational process of the ATVS 10. Upon receipt of an event signal, the base station 26 captures location data, i.e., sensor readings, for each location sensor 46, as illustrated at operation 202. Execution of the ATVS algorithm then sequentially analyzes the sensor readings for each location sensor 46. Beginning with a first location sensor 46, the ATVS algorithm determines if the location of the first location sensor 46 is fully known, i.e., whether the first location sensor is unblocked, as indicated at operation 204. If the first location sensor 46 is not unblocked, the ATVS algorithm determines whether a possible location of the first location sensor 46 can be determined by first location sensor 46 reading, i.e., whether the first sensor is partially 'blocked', as indicated at operation 206. If the first location sensor 46 is completely 'blocked', the ATVS algorithm begins the same analysis at 204 for a second location sensor 46 as indicated at operation 208.

However, if the first location sensor 46 is either determined to be unblocked, at 204, or partially blocked, at 206, the ATVS algorithm calculates the distance between each point in a virtual object locus 66 for the first location sensor 46 and a first candidate feature, as indicated at operation 210. Next, the angle between each point in the first location sensor 46 virtual object locus 66 and the first candidate feature is determined, as indicated at operation 212. A probability score is then generated for the first candidate feature based on the distance and angle between each point in the first location sensor 46 virtual object locus 66 and the first candidate feature, as indicated at operation 214. The probability score for the first candidate feature is then stored in a register or accumulator (not shown) of the base station 26, as indicated at operation 216. The ATVS algorithm then determines whether the first candidate feature is the last candidate feature, as indicated at operation 218. If not, the ATVS algorithm generates a probability score for a second candidate feature, and for all subsequent candidate features, and stores the probability score for each candidate feature as indicated at operations 210 through 218. Upon generation of a probability score for the last candidate feature, the ATVS algorithm determines whether the first location sensor 46 is the last location sensor 46 that is fully or partially known, i.e., unblocked or partially blocked, as indicated at operation 220.

If the first location sensor 46 is not the last location sensor 46, the ATVS algorithm begins the same analysis of sensor readings for a second location sensor 46, as indicated at operation 222. Then as described above with regard to the first location sensor 46, the ATVS algorithm generates a probability score for each candidate feature relative to a second location sensor 46 object locus 66, as indicated at operations 210 through 214. The probability score for each candidate feature relative to the second location sensor 46 object locus 66 is then added to the probability scores for that candidate feature stored in the register, and the accumulated scores for each candidate feature then replace the prior probability scores in the register, as indicated at operation 216. The generation and accumulation of the probability scores for each candidate feature, relative to virtual loci 66 for each location sensor 46, is completed for each location sensor 46, as described at operations 210 through 220. After all probability scores are accumulated the ATVS algorithm returns the candidate feature with the highest probability score, as indicated at operation 224. This candidate feature is considered to be the feature operated on at the time of the event signal.

As illustrated in FIG. 5, in various embodiments a cost function may be used to verify task completion. The cost function may be a weighted linear function combining position and orientation of the points in the virtual locus 66. For example, for an exact match the cost function may give a score of "1". For matches above a certain upper threshold, e.g., 40%, but not an exact match, the cost function may give a score between 0 and 1. For poor matches, for example matches below a certain lower threshold such as 40%, the cost function may give a score of 0. The thresholds used are sized based on the uncertainty of measurement of location sensor 46 reading relative to the features of interest. For example, if the candidate features are closely spaced, e.g., 0.25 inch (6.35 mm) apart, then the upper and lower thresholds will be set to higher values to achieve a high level of confidence that the candidate feature identified as the feature operated on is actually the feature operated on. However, if the candidate features are further spaced apart, e.g., one foot (30.48 cm) apart, the level of the thresholds do not need to be as high to achieve a high level of confidence that the candidate feature identified as the feature operated on is actually the feature operated on.

Figure 6:
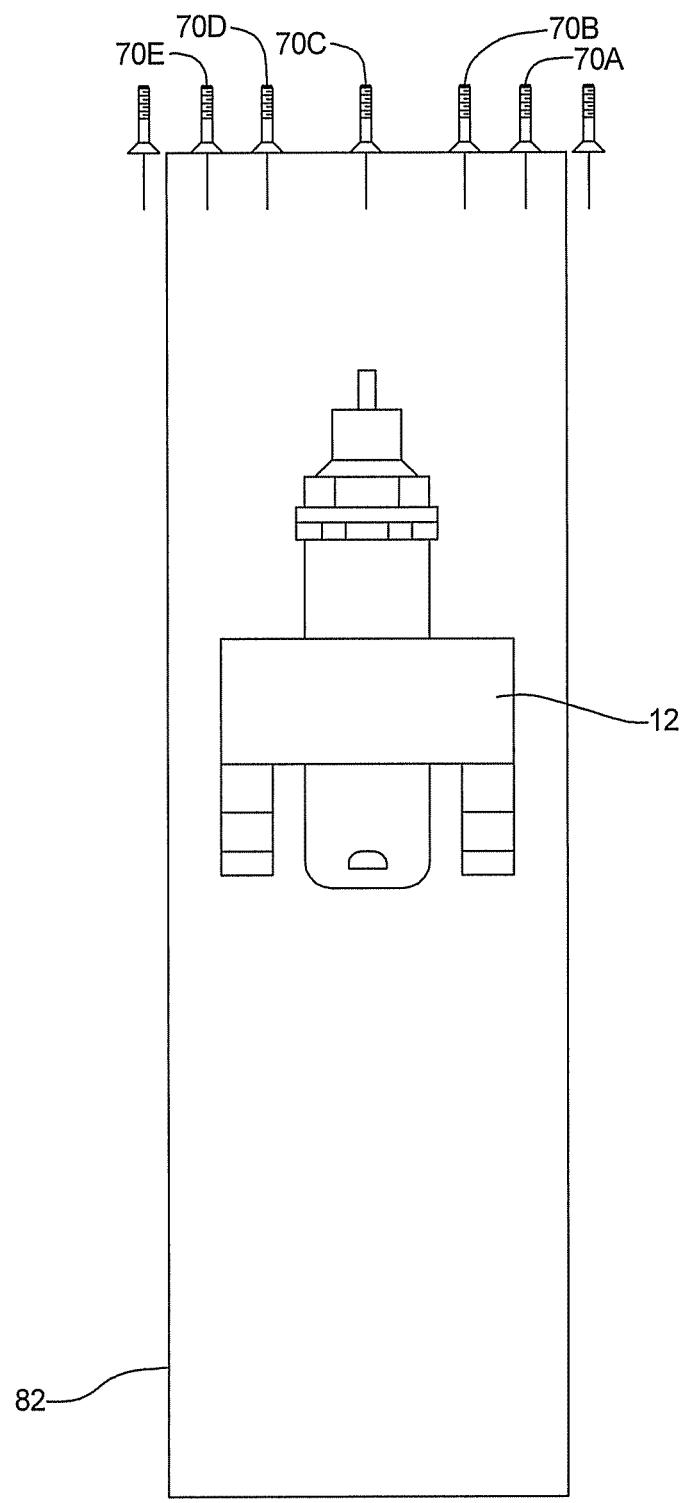
FIG. 6 is an exemplary illustration of a bounding volume generated by execution of a ATVS algorithm used by the ATVS system shown in FIG. 1.

Referring now to FIG. 6, in various embodiments, the time complexity of calculations performed during the execution of the ATVS algorithm may be reduced by only analyzing features that fall within a generated bounding volume 82. The bounding volume 82 may be select set of candidate features. This select set of candidate features within the bounding volume is defined based on the location reading of any one of the location sensors 46 that is unblocked. The ATVS algorithm selects a certain number of features that are the closest to location coordinates of the selected location sensor 46, e.g., features 70A, 70B, 70C, 70D and 70E. The ATVS algorithm then only analyzes the probability that the selected candidate features are the features operated on. In this way features that are outside of the bounding volume 82 are rejected as impossible prior to calculating the probability on the remaining candidate features.

In various other embodiments the base station 26 may be an intermediate computer based subsystem communicatively linked between the location sensors 46 and a second computer-based subsystem (not shown). In such a case, the second computer-based subsystem includes a processor, an electronic storage device, and in various embodiments, a data base, for storing and executing the ATVS algorithm. Thus, the base station 26 receives data and information (e.g., tool location data) from the location sensors 46 and also communicates with a second computer based subsystem that calculates probabilities to determine verification of the completion of one or more assembly tasks.

Figure 7:
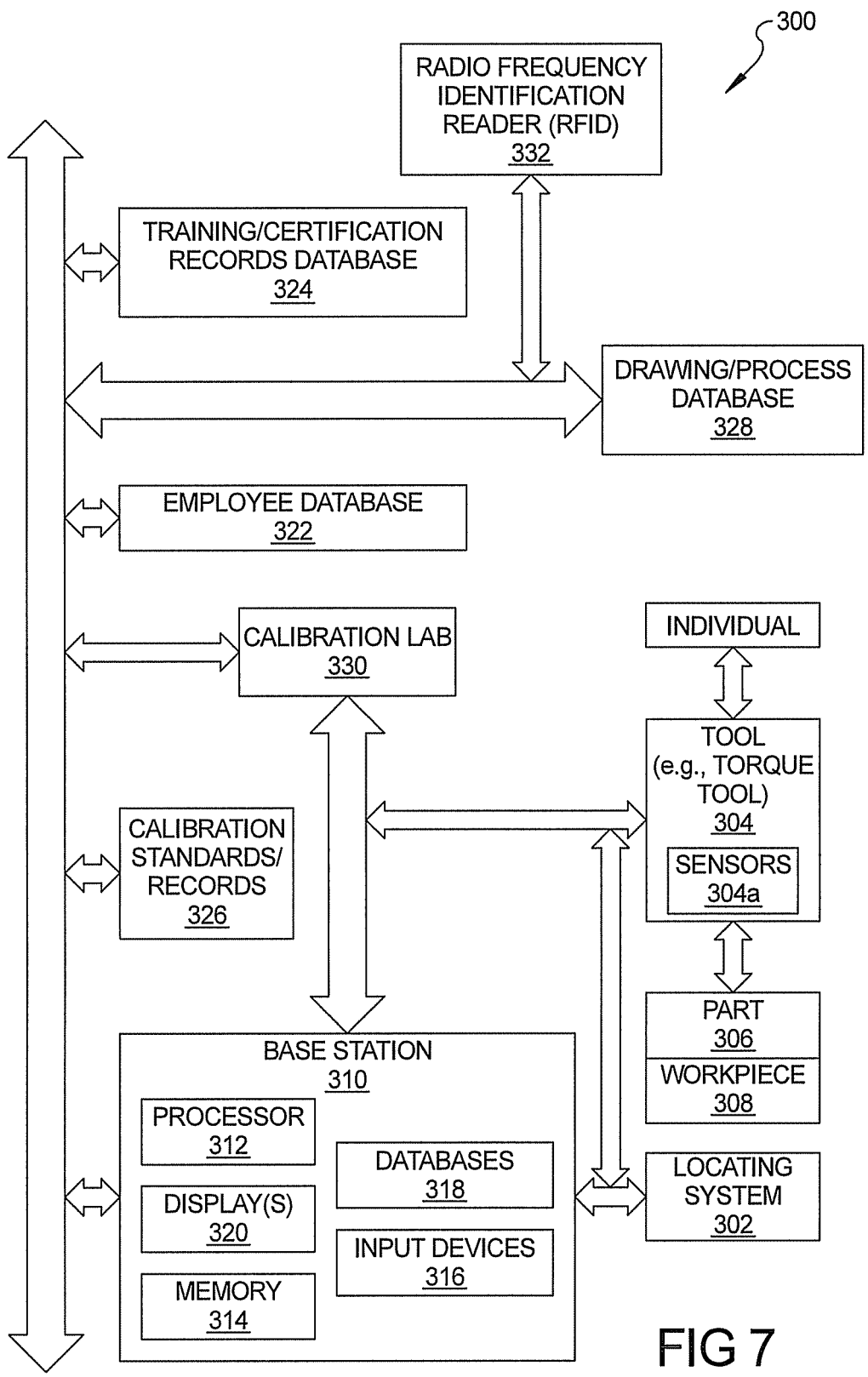
FIG. 7 is a block diagram of a system for creating an electronic record of a manufacturing operation using an indoor GPS system.

Referring now to FIG. 7, one embodiment of a system 300 is shown for generating electronic quality records of a manufacturing operation. While the following discussion makes reference to a "manufacturing operation", it will be appreciated that this terminology may include any form of assembly, test, repair, maintenance or verification procedure that is required to be performed. The system 300 is expected to find particular utility in aircraft and aerospace manufacturing applications where highly complex manufacturing operations are encountered, and where significant importance is placed on individuals following predetermined process or assembly procedures, using properly calibrated tools, and certified parts or consumables. However, it will also be appreciated the system 300 may be adapted with little or no modifications to any environment where an individual is required to perform one or more operations while carrying out a specified task. The system may be especially valuable in environments/applications that require government oversight, such as in performing aircraft maintenance/repair procedures.

In FIG. 7 the system 300 makes use of a locating system 302 that monitors the radio frequency outputs from a plurality of sensors 304a of a tool 304 being used by an individual. The tool 304 is being used to perform a manufacturing operation, such as an assembly, test, repair or maintenance operation, through the use of a part 306 (rivet, screw, drill bit) that is being used on a work piece 308. The tool 304, part 306, the work piece 308 and the locating system 302 may be located within a predefined base station 310. The locating system 302 may comprise an indoor GPS object locating system such as system 18 that is not affected by lighting or environmental conditions that obscure visibility of the tool 304 and/or part 306.

The system 300 may also include a base station 310 having a processor 312. The base station 310 may be identical to base station 26, and may include a processor 312, a memory 314, input devices 316, one or more databases 318 and one or more display devices 320. Several subsystems may be in communication with the base station 310 including an employee database 322 that holds names and other pertinent information for employees located at the manufacturing facility, such as which employees are certified to use certain tools and/or perform certain procedures. A training/certification records database 324 may used to store training and/or certification records indicating what type(s) of training and/or certification are needed to operate certain tools or to perform specific manufacturing operations. A calibration/standards records database 326 may be used to store calibration and/or certification information for the tool 304, as well as certification information for the part(s) or consumable items used during a manufacturing operation. A drawing/process database 328 may be used to store drawing information for the part 306 and/or process information for various manufacturing operations that needs to be closely followed when performing specific manufacturing operations.

The system 300 may also make use of a calibration lab 330 that calibrates tools and equipment. For example, consider the situation where parts (such as threaded fasteners) are required to be tightened to a specified torque (usually inch/pounds or foot/pounds). In order to verify that the tools meet some national standard they are calibrated to meet that standard. This calibration typically happens on a cyclic schedule (i.e., once a year, etc.) based on the probability for the tool to go out of its calibration specification. It is often important to keep track of the re-calibration dates so that calibrated tools are always being used by workers.

The system 300 may also make use of a radio frequency identification (RFID) reader 332 that wirelessly reads a tag affixed to the part 306 and communicates information to the processor to verify that a particular part is being used by the individual operating the tool 304. The processor 312 of the base station 310 may communicate (unidirectionally or bidirectionally as needed) with the various subsystems 322-332 by various wired or wireless buses. As another example, consider that in the present aircraft manufacturing industry, tools are typically calibrated with a sticker which indicates date calibrated and date for re-calibration. This information could be entered into a database. Ideally it would be made electronically available via an RF tag affixed to the tool which is read by the RFID reader 332. Thus, for example, as soon as a technician steps into a work cell the RFID reader 332 would know when the tool was last calibrated and wouldn't allow the technician to use the tool if it was out of calibration (i.e., calibration expired).

In operation the individual using the tool 304 may enter his/her name using one of the input devices 316, along with any other needed information such as the type of manufacturing process being performed. The system 300 accesses the drawing/process database 328 to determine needed information on the configuration of the part. The processor 312 may also access the training/certification records database 324 to determine that the individual is authorized to be using the system 300, as well as what specific training or certification is required for the operator to be authorized to perform the manufacturing operation about to be undertaken by the individual. The processor 312 may also access the calibration standards/records database 326 for to check calibration information for the tool 304 that will be used in the manufacturing operation. Information from the calibration lab 330 may be communicated to the processor 312. Just prior to the manufacturing operation being started, the processor preferably communicates with the RFID reader 332 to verify that the part 306 (or consumable) being used in the operation is certified a part or consumable for the specific operation being undertaken.

As the individual commences performing the work operation with the tool 304, the locating system 302 continuously monitors the location of the tool in real time. Information on tool performance (e.g., the torque sensed at a drill bit of the tool), may be communicated either wirelessly or by a suitable cable using electrical (or optionally optical) signal information to the processor 312 in real time. Upon the generation of an event signal by the tool (e.g., a sudden drop in torque sensed at the drill bit of the tool), the sensors on the tool 304 wirelessly communicate the location of the pertinent part of the tool (such as the tip of a drill bit within a drill) to the locating system 302. The locating system 302 may communicate a wireless or wired signal in real time to the processor 312 informing the processor of the precise location of the relevant part of the tool 304 at the instant that the event signal is received. Using information obtained/recorded from all of the various databases of the system 300, as well as the RFID reader 332, the system 300 creates a real time electronic quality record to verify various important factors of the manufacturing operation just performed. As explained above, such factors may include one or more of the following, without limitation:

1) name of the individual performing the operation;
2) training/certification possessed by the individual;
3) specific process(s)/operation(s) being formed;
4) specific tool being;
5) specific part being used;
6) certification for part being used;
7) specific location of relevant part of the tool, relative to the work piece, at the time the event signal is generated by the tool; and
8) log of movement of the tool and specific process operations performed by the tool during the overall manufacturing operation.

Figure 8:
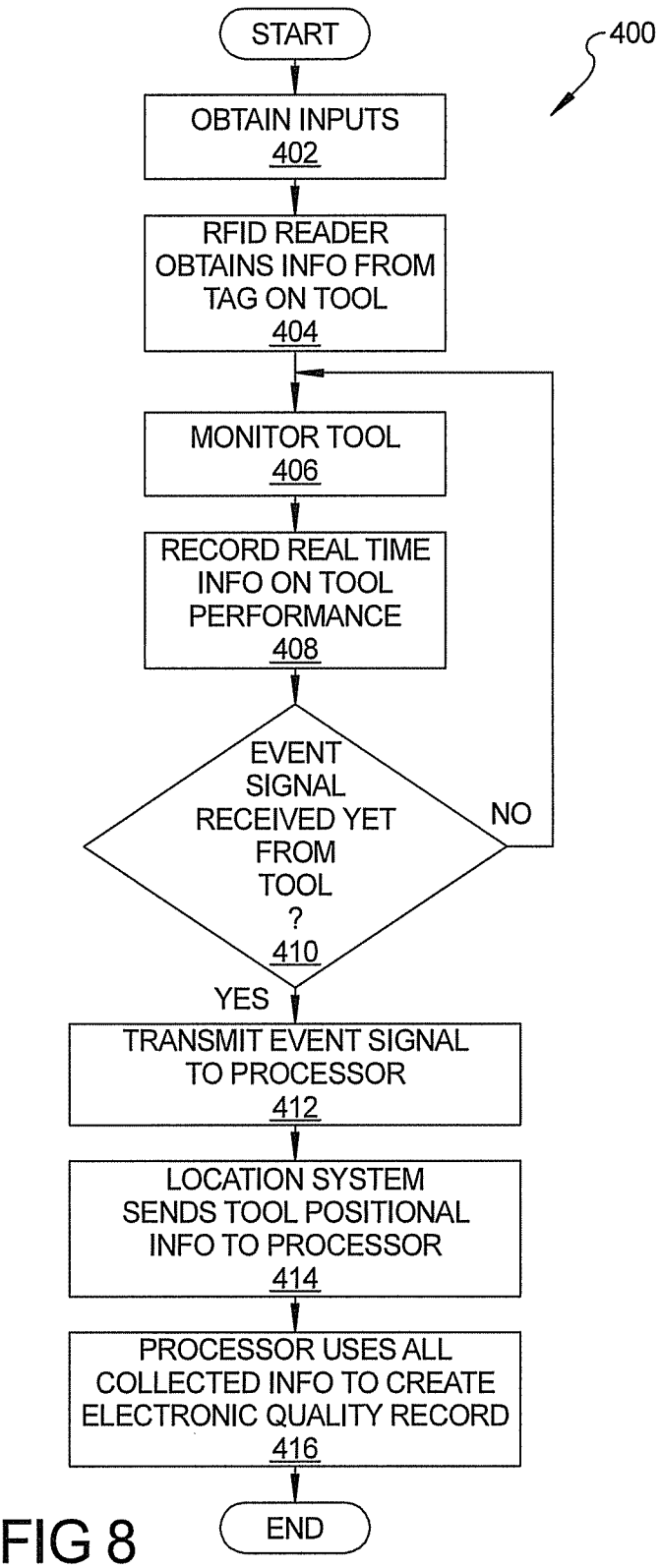
FIG. 8 is an exemplary flowchart of operations performed by the system of FIG. 7.

Referring to FIG. 8, a flowchart 400 of major operations performed by the system 300 is presented. Initially, all needed inputs are obtained, as indicated at operation 402. These inputs may be those mentioned above, such as name of the individual, certification possessed by the individual, drawings or process information needed for the operation, etc. At operation 404 the RFID reader 332 obtains the information from the tag on the tool 304 and communicates it to the processor 312. Monitoring of the tool 304 commences at operation 406. Pertinent real time information relating to tool performance may be monitored and recorded, as indicated at operation 408. At operation 410, a check is made if the event signal has been generated by the tool 304. If not, a loop is made back to operation 406. If the event signal has been generated, the event signal is transmitted to the processor 312 as indicated at operation 412, and the sensors on the tool transmit positional information concerning the tool 304 to the locating system 302. The locating system 302 then provides highly precise positional information concerning the tool 304 to the processor 312, as indicated at operation 414. The system 300 uses all of the previously obtained information concerning the carrying out of the manufacturing operation to create a detailed, real time electronic quality record, as indicated at operation 416. The electronic quality record may be stored in the memory 314 and/or displayed on the display 320. Various output devices, for example a printer, may also be connected to the base station 310 to print out the electronic quality records.

From the foregoing it will be appreciated that the system 300 can be used to construct a comprehensive electronic quality record, in real time, for virtually any type of manufacturing process or operation, where a highly detailed record of the performance of the operation is desired or required. While the system 300 is expected to prove especially useful in connection with aircraft and aerospace manufacturing operations, virtually any form of manufacturing, test, maintenance or repair operation may be monitored using the system 300 to create an electronic record of the operation. Operations outside of the manufacturing sphere may also be monitored with the system 300. For example, in a medical environment, where it is needed ensure sterility of instruments, and having a record of a sterilization process performed in part by an individual would be helpful, the system 300 could be implemented with little or no modification.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for verifying performance of a particular task, the method comprising:
   predefining a work cell within a localized environment to assemble a structure; wherein said work cell comprises a portion of an automated assembly line process within said localized environment;
   generating inputs from a plurality of information sources located within a manufacturing environment, the plurality of information sources providing information pertaining to at least a task to be verified, an individual using a tool, an operation that the tool is being used by the individual to perform on a work piece, and the plurality of information sources including at least one sensor carried on the tool;
   using a wireless locating system in wireless communication with the sensor carried on the tool to wirelessly monitor a location and an operation of the tool, the monitoring of the location of the tool and the operation of the tool including the monitoring for a wireless event signal generated from the tool upon the occurrence of a predetermined performance event of the tool, relative to the work piece, and the wireless locating system generating wireless location information during operation of the tool;
   the sensor receiving and using the wireless location information to generate a wireless position signal transmitted therefrom that is indicative of a position of the tool within a predetermined work cell in which the tool is being used;
   using the tool to generate the wireless event signal when the predetermined event is detected to have occurred;
   using a processor in communication with the wireless locating system to receive the wireless signal transmitted from the tool, to receive the wireless event signal, and to receive the generated inputs;
   using a computerized assembly of the work piece, and to consider a location and orientation of the structure within the predetermined work cell;
   further using the processor to generate a probability that a specific feature of the work piece was acted on by the tool; and
   further using the processor to determine if the probability meets a minimum threshold, and if so, to then generate an electronic record identifying that the task has been completed on the specific feature of the work piece in accordance with a predefined standard.

2. The method of claim 1, wherein:
   said using a wireless locating system comprises using an indoor object locating system and wherein the work cell moves with the structure and the relationship between a work cell coordinate structure and the structure remains fixed and unchanged.

3. The method of claim 1, wherein said generating inputs from a plurality of information sources comprises generating inputs from a database of individuals authorized to perform said operation with said tool, and wherein the work cell move and the structure move during use of the tool on the structure.

4. The method of claim 1, wherein said generating inputs from a plurality of information sources comprises generating inputs from a database of calibration information pertaining to calibration of said tool.

5. The method of claim 1, wherein said generating inputs from a plurality of information sources comprises generating inputs from a training database providing information on specified training that the individual is required to have in order to use said tool in performing said operation.

6. The method of claim 1, wherein said generating inputs from a plurality of information sources comprises using a radio frequency identification (RFID) reader to read an RFID tag associated with a component on which the task is being performed, to apprise the processor of the nature of the component.

7. The method of claim 1, wherein said generating inputs from a plurality of information sources comprises generating information using a database of at least one of drawings and procedures pertaining to carrying out said task.

8. The method of claim 7, wherein said operation that said individual is using said tool to perform comprises one of:
   an assembly operation;
   a test operation;
   a repair operation; and
   a maintenance operation.

9. The method of claim 1, wherein said using a processor comprises using a processor that forms part of an integrated electronic monitoring system able to store information and to display at least portions of said electronic record on a display system.

10. A method for verifying performance of a particular assembly task or operation and generating a real time electronic quality record of a manufacturing operation, the method comprising:
    predefining a work cell within a localized environment wherein an operator performs in accordance with computerized assembly, design drawings, or schematics an assembly task required to assemble a structure, said work cell comprises a portion of an automated assembly line process within said localized environment;

generating inputs from a plurality of information sources located within a manufacturing environment, the plurality of information sources providing information pertaining to at least:
- a tool being used, the tool carrying at least one location sensor adapted to receive wireless position indicating signals;
- certification of an individual using the tool;
- calibration information for the tool; and
- specifications for an operation that the tool is being used by the individual to perform;

using a wireless indoor object locating system including a beacon signal generating device, in communication with the at least one location sensor disposed on the tool, to monitor a real time location of the tool within said manufacturing environment, and relative to a work piece being operated on by said individual using said tool, as the tool is performing a work operation, the beacon generating wireless, timed signal pulses during operation of the tool;

generating a wireless event signal from the tool that indicates that a predetermined operation, using the tool, has been completed;

generating wireless position signals from the at least one sensor, using information gleaned from received ones of the beacon signals, that are indicative of a real time position of a specific portion of the tool at the time the wireless event signal is generated;

using a processor in communication with the object locating system to receive the generated inputs, and to receive the wireless event signal, and to receive the wireless position signals from said at least one location sensor at the time the wireless event signal is generated;

using the processor to determine a plurality of possible features on the work piece that may have been acted on by the specific portion of the tool, and determining a probability for each one of the possible features that any specific one of the possible features was a specific feature acted on by the tool;

using the processor to compare each of the probabilities to a predetermined threshold, to identify the specific feature on the workpiece that was acted on by the tool; and generating an electronic quality record upon receipt of the event signal that indicates completion of the operation that the tool is being used to perform.

11. The method of claim 10, wherein said generating inputs from a plurality of information sources comprises generating an input using information from a training database to indicate whether said individual has a particular certification to be using said tool to perform said operation.

12. The method of claim 10, wherein said generating inputs from a plurality of information sources comprises generating information using a radio frequency (RF) identification system in radio frequency communication with an RF identification tag carried by a part that said tool is acting on while performing said operation.

13. The method of claim 10, wherein the calibration information for the tool comprises information generated using a calibration data base including calibration information for the tool.

14. The method of claim 10, wherein said using a processor comprises using a processor in communication with a memory for storing said inputs, and wherein said processor and said memory form a portion of a base station located within said manufacturing environment.

15. The method of claim 14, further comprising using a display in communication with said processor to display information pertaining to said electronic record.

16. A system for verifying performance of a particular assembly task or operation and generating an electronic record of a manufacturing operation, the system comprising:
- a work cell predefined within a localized environment wherein an operator performs in accordance with computerized assembly, design drawings, or schematics an assembly task required to assemble a work piece, said work cell comprises a portion of an automated assembly line process within said localized environment;
- a plurality of information sources located within a manufacturing environment, the plurality of information sources providing information pertaining to at least a tool being used, an individual using the tool, an operation that the tool is being used by the individual to perform, and a wireless event signal indicating that the operation has been completed;
- at least one sensor disposed on the tool;
- a wireless locating system disposed within the manufacturing environment in communication with the plurality of information sources to wirelessly monitor a location and an operation of the tool, the wireless locating system generating a beacon signal that is received by the at least one sensor and which includes position locating information; and
- a base station having a processor in communication with the wireless locating system to receive a wireless signal from the at least one sensor, and at least one additional input;
- a processor configured to determine a three dimensional locus that envelops the work piece and which identifies therein a plurality of possible points on a surface of the work piece that a portion of the tool may have operated on at the time the wireless event was generated, the processor further adapted to determine, via a probability analysis, which one of the possible points on the surface of the work piece was in fact a specific point that was acted on the work piece by the tool, and to generate an electronic record that the assembly task has been performed by the individual using the tool in accordance with a predefined standard.

17. The system of claim 16, wherein the base station further includes a memory for storing the electronic record.

18. The system of claim 16, wherein the base station further includes a display for displaying the electronic record.

19. The system of claim 16, wherein the wireless locating system comprises an indoor object locating system in communication with the at least one locating sensor located on said tool.

20. The system of claim 16, further comprising a radio frequency identification (RFID) reader in communication with a part being acted on by said tool during said operation, and wherein said part includes an RF identification tag.

21. A method for verifying performance of a particular task, the method comprising:
- predefining a work cell within a localized environment to assemble a structure;
- generating inputs from a plurality of information sources that include at least one sensor carried on the tool;
- using a wireless locating system in wireless communication with the sensor carried on the tool to wirelessly monitor for a wireless event signal generated from the tool upon the occurrence of a predetermined performance event of the tool;

further receiving and using wireless location information associated with the tool to track a position of the tool within the work cell as the tool is being used, and to generate the wireless event signal when the predetermined event occurs;

using a processor in communication with the wireless locating system to receive the generated inputs, the wireless location information and the wireless event signal, and to generate a probability that a specific feature of the work piece was acted on by the tool, and to determine whether the generated probability meets a minimum threshold; and when the generated probability meets the minimum threshold, generating an electronic record identifying that the task has been completed on the specific feature of the work piece.

* * * * *